(12) United States Patent
Tsuneya et al.

(10) Patent No.: US 6,990,601 B1
(45) Date of Patent: Jan. 24, 2006

(54) APPARATUS AND METHOD FOR MANAGING NETWORK AND COMPUTER-READABLE RECORDING MEDIUM THEREOF

(75) Inventors: Akira Tsuneya, Kawasaki (JP); Masato Nitta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 783 days.

(21) Appl. No.: 09/671,008

(22) Filed: Sep. 27, 2000

(30) Foreign Application Priority Data

Oct. 28, 1999 (JP) ................................. 11-306365

(51) Int. Cl.
*G06F 11/00* (2006.01)

(52) U.S. Cl. .............................. 714/4; 714/57; 714/48; 715/734; 715/736

(58) Field of Classification Search .................. 714/48, 714/57, 4; 709/318; 345/734, 735, 736, 345/737; 719/318; 715/734, 735, 736, 737
See application file for complete search history.

(56) References Cited

U.S. PATENT DOCUMENTS

| | | | | |
|---|---|---|---|---|
| 5,436,909 A | * | 7/1995 | Dev et al. | 714/4 |
| 5,559,955 A | * | 9/1996 | Dev et al. | 714/4 |
| 5,655,068 A | * | 8/1997 | Opoczynski | 714/4 |
| 6,430,712 B2 | * | 8/2002 | Lewis | 714/47 |
| 6,507,852 B1 | * | 1/2003 | Dempsey et al. | 707/201 |
| 6,646,656 B1 | * | 11/2003 | Walker et al. | 345/734 |
| 2002/0140725 A1 | * | 10/2002 | Horii | 345/736 |

* cited by examiner

*Primary Examiner*—Robert Beausoliel
*Assistant Examiner*—Christopher McCarthy
(74) *Attorney, Agent, or Firm*—Greer, Burns & Crain, Ltd.

(57) ABSTRACT

In an apparatus for monitoring devices connected to a network, an event collecting part collects each event received from the devices and controls an event table to maintain device information when the event indicates a problem. A problem alarm notifying part determines, based on dependent information maintained by a relationship object maintaining part, whether or not each of the devices identified by the device information maintained in the event table influences another device by the problem, and specifies which device is causing the problem in accordance with a result of the determination.

19 Claims, 12 Drawing Sheets

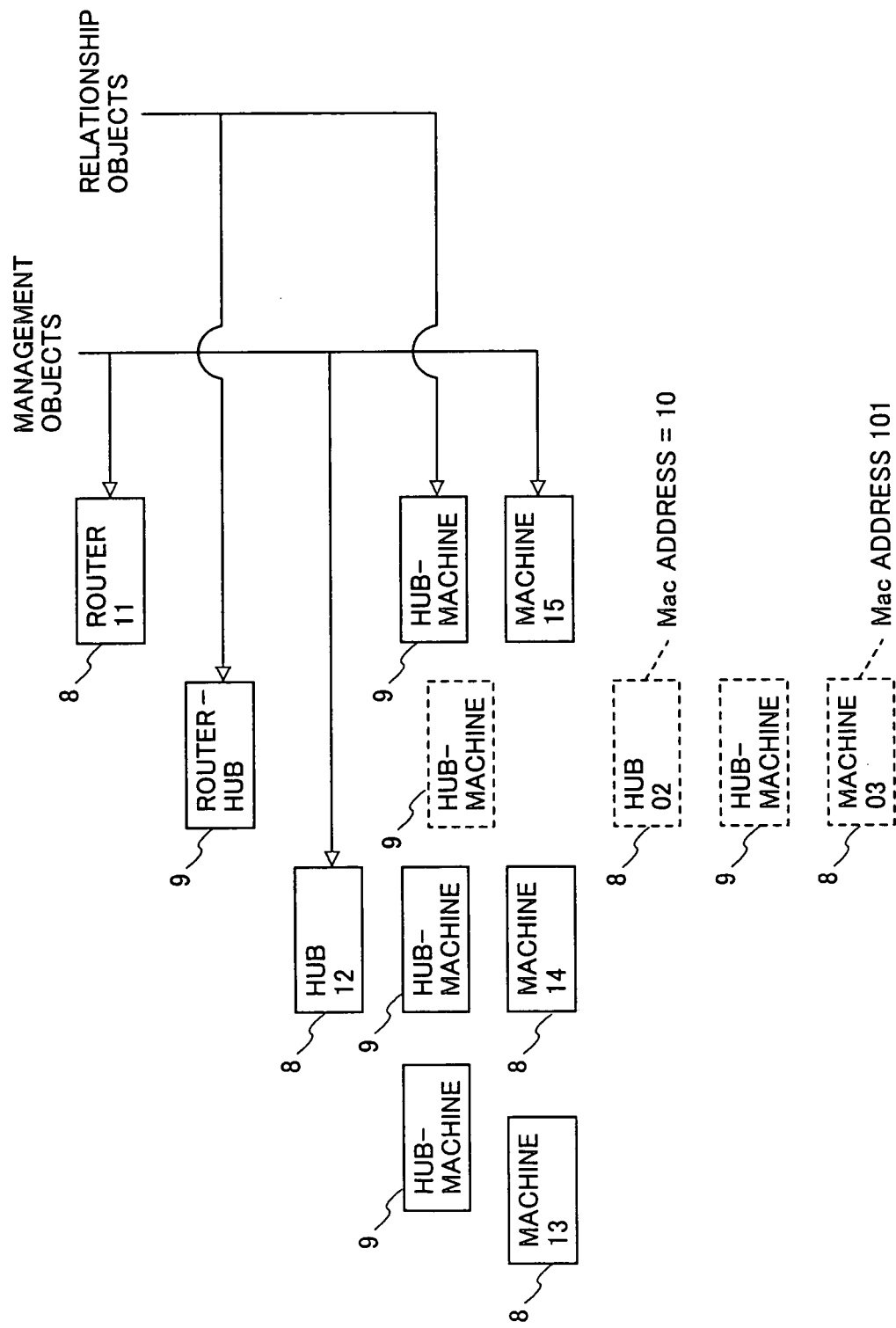

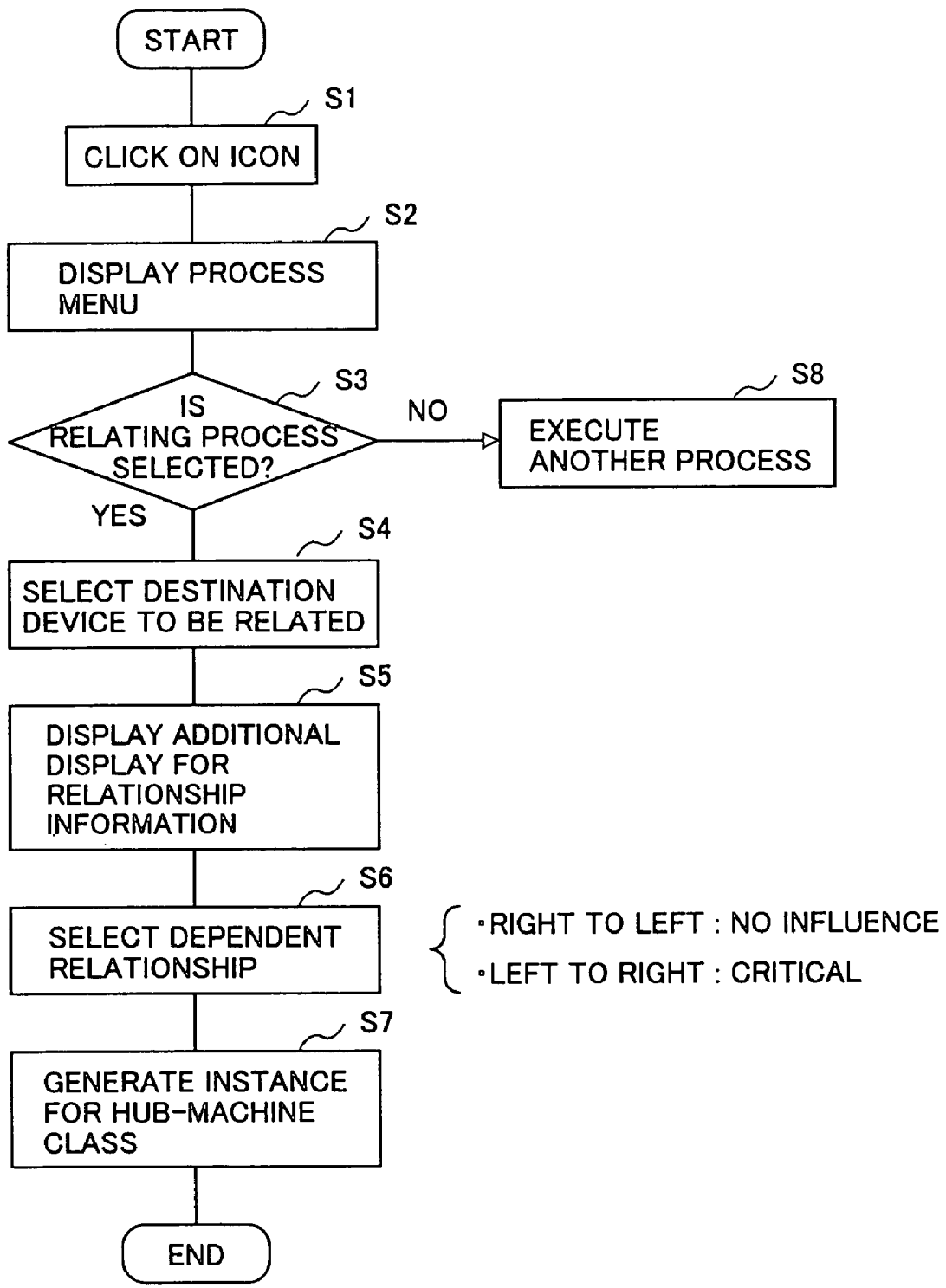

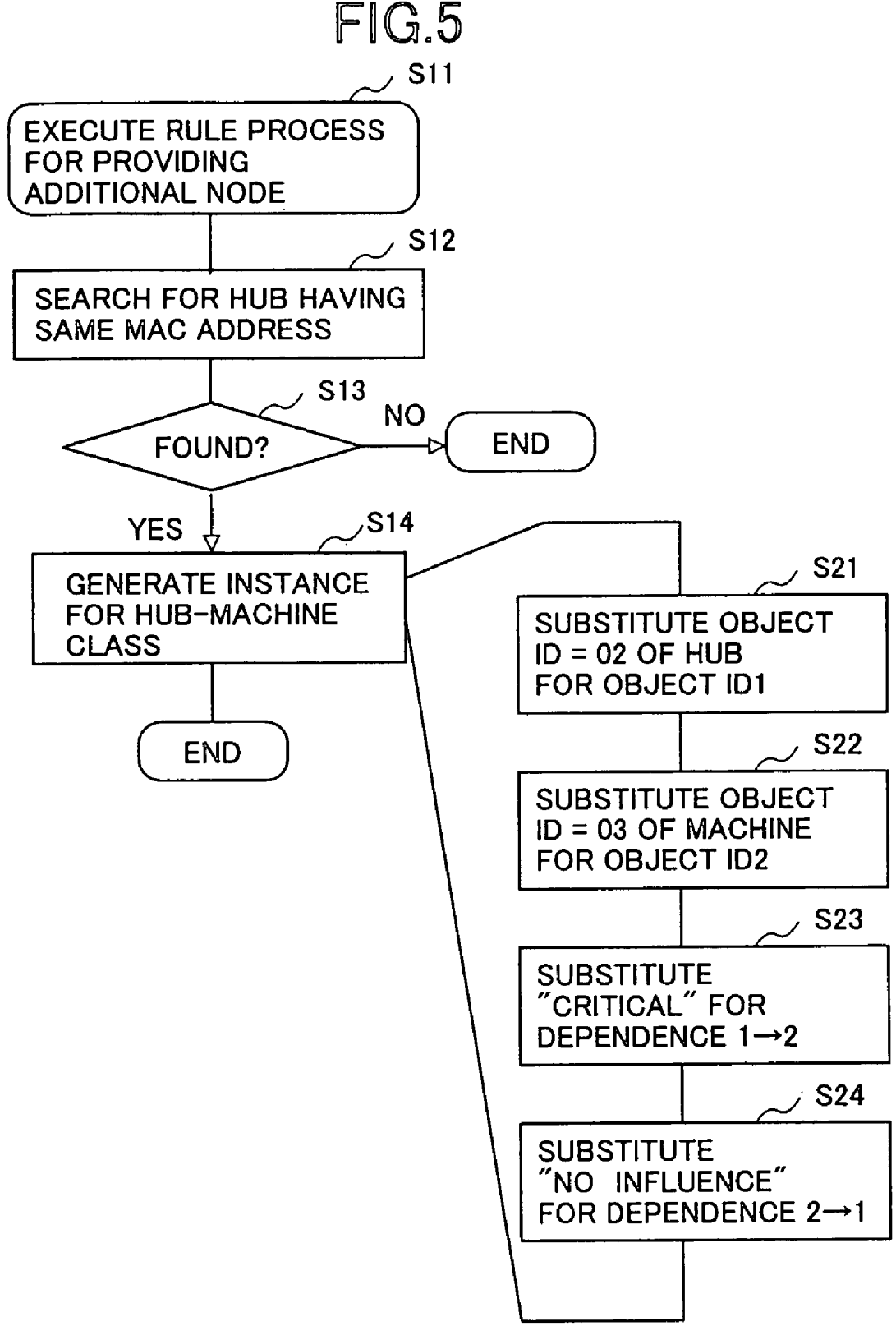

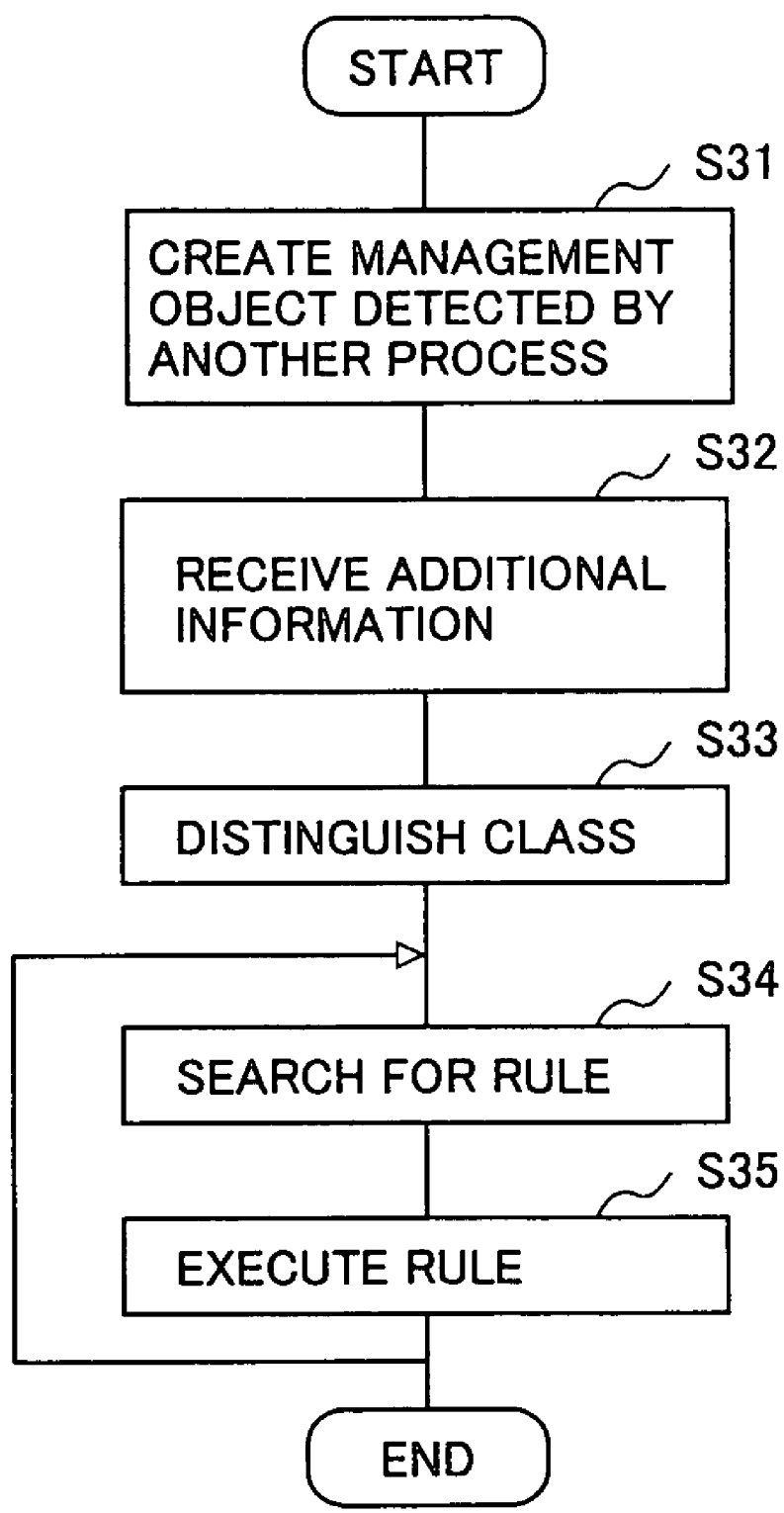

FIG.7

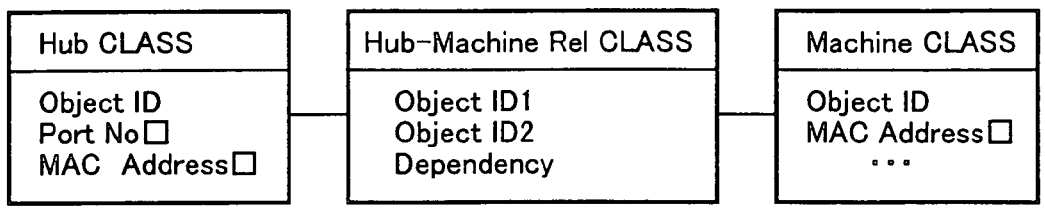

Hub CLASS : INDICATE HUB
Machine CLASS : INDICATE MACHINE
Hub-Mchine Rel CLASS : INDICATE RELATIONSHIP BETWEEN INSTANCE OF
　　　　　　　　　　　　MACHINE CLASS
Object ID : ID IDENTIFYING INSTANCE OF CLASS
Port No : EACH PORT NUMBER OF HUB(ARRAY)
MAC Address : PORT OF HUB AND MAC ADDRESS FOR INTERFACE OF
　　　　　　　　MACHINE
Object ID1/2 : INSTANCE ID RELATED BY Hub-Machin Rel CLASS
Dependency : DEPENDENT RELATIONSHIP OF INSTANCE RELATED BY
　　　　　　　　Hub-Machine Rel CLASS

FIG.8

```
RULE 1 [
  CLASS1 OF MANAGEMENT OBJECT TO BE MANAGED:
    Hub CLASS
  CLASS2 OF MANAGEMENT OBJECT TO BE MANAGED:
    Machine CLASS
  CONDITION:
    CLASS OF RELATIONSHIP OBJECT TO BE GENERATED WHERE
    MAC Address PROPERTY FOR CLASS1 IS SAME AS MAC Address
    PROPERTY FOR CLASS 2
  CLASS OF RELATIONSHIP OBJECT TO BE GENERATED:
    Hub-Machine Rel CLASS
  PROPERTY OF RELATIONSHIP OBJECT TO BE GENERATED:
    Dependency PROPERTY ← INSTANCE OF CLASS 2 DEPENDS ON
                           INSTANCE OF CLASS 1
    Dependency PROPERTY ← INSTANCE OF CLASS 1 DOES NOT
                           INFLUENCE INSTANCE OF CLASS 2
```

FIG.10A

| HUB ID | OBJECT ID | MAC ADDRESS CONNECTED TO PORT | | OWN MAC ADDRESS | |
|---|---|---|---|---|---|
| HUB0 | 02 | 0 | MAC 100 | | |
| | | 1 | MAC101 | 10 | |
| | | ⋮ | | | |

FIG.10B

| MACHINE ID | OBJECT ID | MAC ADDRESS | |
|---|---|---|---|
| MACHINE | 03 | MAC 1 | |
| | | | |

FIG.10C

| HUB-MACHINE ID | OBJECT ID1 | OBJECT ID2 | DEPENDENCE 1 → 2 | DEPENDENCE 2 → 1 |
|---|---|---|---|---|
| HUB-MACHINE | 02 (PARENT) | 03 (CHILD) | CRITICAL | NO INFLUENCE |
| | | | | |

| EVENT ID | OBJECT ID | SUPPRESSION STATUS (SUPPRESS-FLAG) | |
|---|---|---|---|
| 00 | HUB ID | OFF | |
| 01 | MACHINE ID | ON | |
| | | (·DEGRADE CRITICAL LEVEL) | |

APPARATUS AND METHOD FOR MANAGING NETWORK AND COMPUTER-READABLE RECORDING MEDIUM THEREOF

BACKGROUND OF THE INVENTION

1. Field of the Invention

The present invention generally relates to apparatuses for managing a network, methods for managing the network and computer-readable recording media having a program recorded thereon for causing a computer to manage the network, and more particularly to an apparatus for managing a network, a method for managing the network and a computer-readable recording medium having a program recorded thereon for causing a computer that monitor devices connected to the network to manage the network.

2. Description of the Related Art

Conventionally, in order to handle problems of a distributed system, an agent, which is a program for monitoring computers and network devices (such as a router, a hub or the like) that are connected to a network, is provided to each device in the network. A management server collects configuration information from each agent and displays a map based on the configuration information. The management server receives a problem event, such as a SNMP (Simple Network Management Protocol) trap, sent by the agent when a problem has occurred. Then, the management server blinks an icon indicating the configuration information corresponding to the device where the problem event occurred, so as to notify an administrator of the problem with that device.

Thus, in a case in which a plurality of devices (routers, hubs, computers, and the like) are connected to a network, a problem occurring at a single device may influence other devices. As a result, an icon indicating by the configuration information corresponding to each of the other devices ends up blinking. This makes it difficult to distinguish which device originally caused the problem. Since special knowledge is required to specify which device originally caused the problem, it is difficult to immediately deal with the problem.

Further, the network structure and connected devices (routers, hubs, computers, and the like) to be managed may change. It is desired to recognize this change and automatically specify a problem device.

SUMMARY OF THE INVENTION

It is a general object of the present invention to provide an apparatus for managing a network, a method for managing the network and a computer-readable recording medium having a program recorded thereon for causing a computer to manage the network in which the above-mentioned problems are eliminated.

A more specific object of the present invention is to provide an apparatus for managing a network, a method for managing the network and a computer-readable recording medium having a program recorded thereon for causing a computer to manage the network, which can notify an administrator of a device actually causing a problem in the network.

The above objects of the present invention are achieved by an apparatus for monitoring devices connected to a network, including: a relationship object maintaining part maintaining dependent information for each relationship between devices connected to the network, the dependent information indicating how one device influences another device when the one device causes a problem; an event table maintaining part maintaining device information, which identifies a device in the network, indicated by an event received from the device; an event collecting part collecting each event received from the devices and controlling the event table maintaining part to maintain the device information when the event indicates a problem; and a problem alarm notifying part determining, based on the dependent information maintained by the relationship object maintaining part, whether or not each of the devices identified by the device information maintained by the event table maintaining part influences another device by the problem, and specifying which device is causing the problem in accordance with a result of the determination.

According to the present invention, the device that actually causes a problem can be specified and it is possible to inform the administrator which device causes the problem.

The above objects of the present invention are achieved by a method for managing a network, including the steps of: (a) maintaining dependent information for each relationship between devices connected to the network, the dependent information indicating how one device influences another device when the one device causes a problem; (b) maintaining device information, which identifies a device in the network, indicated by an event received from the device; (c) collecting each event received from the devices and executing the step (b) to maintain the device information when the event indicates a problem; and (d) determining, based on the dependent information maintained in the step (a), whether or not each of the devices identified by the device information maintained in the step (b) influences another device by the problem, and specifying which device is causing the problem in accordance with a result of the determination.

According to the present invention, it is possible to provide the method for managing a network in that the device that actually causes a problem can be specified and it is possible to properly inform the administrator which device causes the problem.

The above objects of the present invention are achieved by a computer-readable recording medium having a program recorded thereon for causing a computer to manage a network, including the codes of: (a) maintaining dependent information for each relationship between devices connected to the network, the dependent information indicating how one device influences another device when the one device causes a problem; (b) maintaining device information, which identifies a device in the network, indicated by an event received from the device; (c) collecting each event received from the devices and executing the code (b) to maintain the device information when the event indicates a problem; and (d) determining, based on the dependent information maintained by the code (a), whether or not each of the devices identified by the device information maintained by the code (b) influences another device by the problem, and specifying which device is causing the problem in accordance with a result of the determination.

According to the present invention, it is possible for the computer that installed the program from computer-readable recording medium to specify the device actually causing a problem and properly inform the administrator which device causes the problem.

BRIEF DESCRIPTION OF THE DRAWINGS

Other objects, features and advantages of the present invention will become more apparent from the following detailed description when read in conjunction with the accompanying drawings, in which:

FIG. 3 is a diagram for explaining objects according to the present invention;

FIG. 4 is a flowchart for explaining operations according to the present invention;

FIG. 5 is a flowchart for explaining a rule process for providing an additional node;

FIG. 6 is a flowchart for explaining a process for generating a relationship object according to the present invention;

FIG. 7 is a diagram showing a class structure according to the present invention;

FIG. 8 is a diagram showing a rule for generating a relationship according to the present invention;

FIG. 10A is a diagram illustrating an instance (management object) of a hub, FIG. 10B is a diagram illustrating an instance (management object) of a machine, and FIG. 10C is a diagram illustrating an instance (management object) of a hub-machine;

FIG. 12 is a diagram showing an event table according to the present invention.

DESCRIPTION OF THE PREFERRED EMBODIMENTS

An embodiment including operations of an apparatus for managing a network according to the present invention will now be described with reference to FIG. 1 through FIG. 12.

Figure 1:
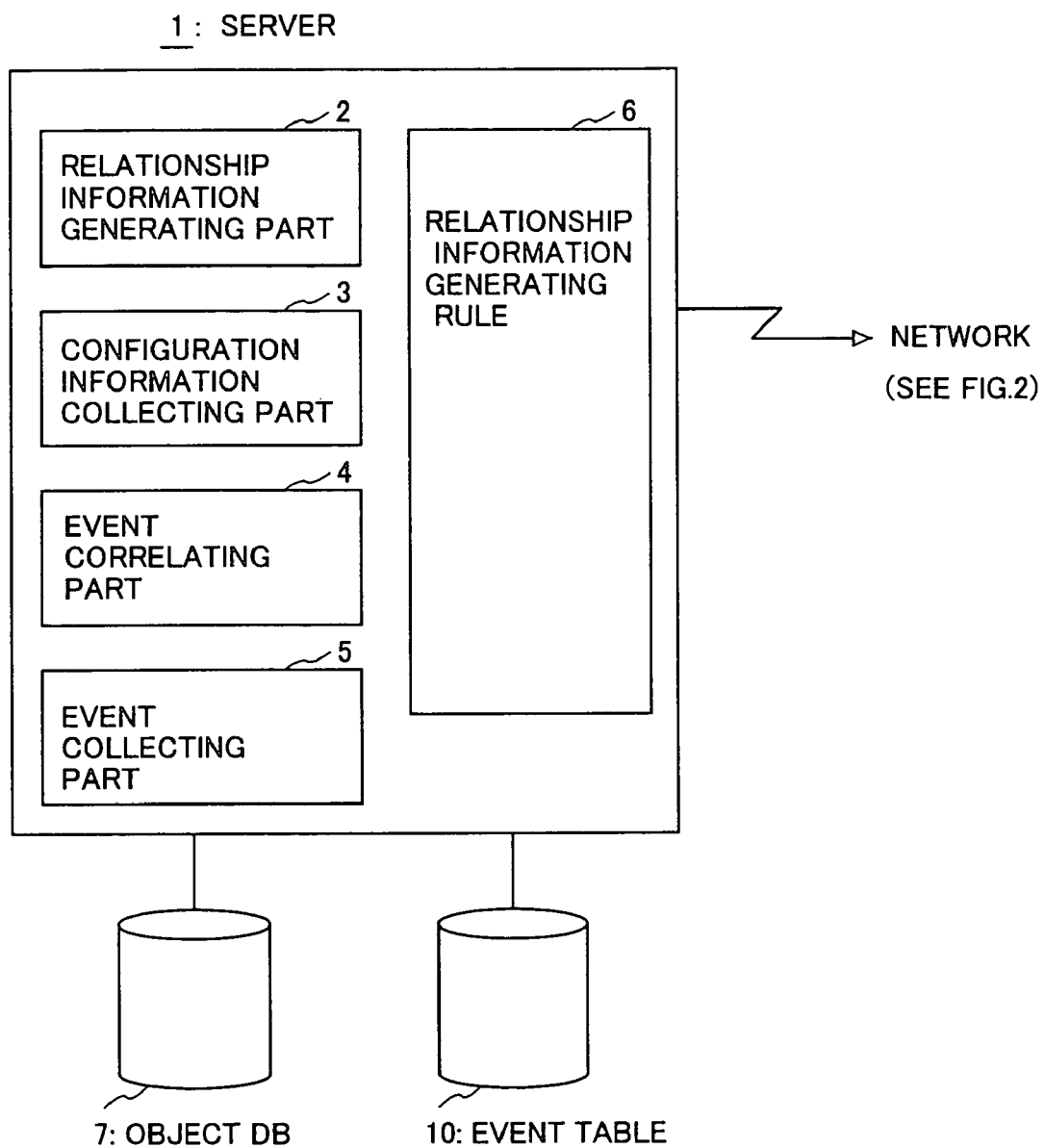
FIG. 1 is a diagram of a system configuration according to an embodiment of the present invention.

FIG. 1 is a diagram of a system configuration according to an embodiment of the present invention.

In FIG. 1, a server 1, as an apparatus for managing a network according to the present invention, monitors routers, hubs, and machines connected to network as devices to be managed and includes a relationship information generating part 2, a configuration information collecting part 3, an event correlating part 4, an event collecting part 5 and a relationship information generating rule 6.

The server 1 loads programs stored in a recording medium (not shown in FIG. 1) in to a main memory such as a RAM and then executes the program concerning each process described later.

The relationship information generating part 2 is used to generate relationship information between the devices to be managed (for example, routers, hubs and machines). The relationship information generating part 2 further stores the relationship information as a relationship object 9 of an object database (object DB).

The configuration information collecting part 3 collects configuration information of the devices to be managed that are connected to the network and further registers the collected configuration information as a management object 8 of an object database (object DB).

The event correlating part 4 is used to check and select a relationship between events. That is, the event correlating part 4 refers to the relationship object 9 corresponding to each event sent from agents 21 shown in FIG. 2 under management control, and checks and selects the relationship between the events.

The event collecting part 5 is used to collect the events from the agents 21 managing the devices.

The relationship information generating rule 6 is a rule for automatically generating relationship information between the devices to be managed (Refer to FIG. 8).

The object DB 7 is used to register and manage objects. That is, the object DB 7 registers and manages the management objects 8 and the relationship objects 9.

The management object 8 is used to register and manage the configuration information of each device to be managed (Refer to FIG. 10A and FIG. 10B).

The relationship object 9 is used to register relationship information between the devices to be managed (Refer to FIG. 10C).

Figure 11:
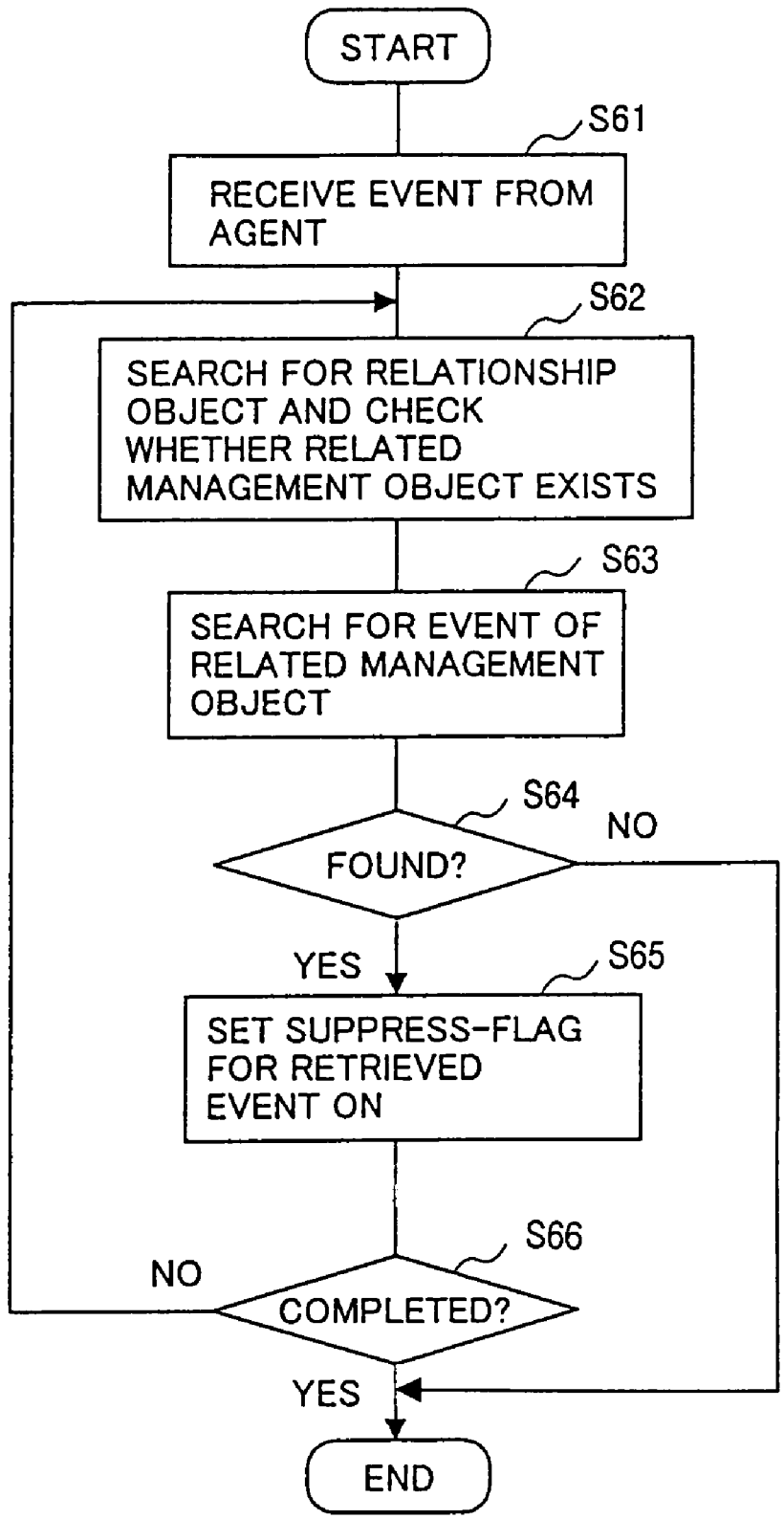
FIG. 11 is a flowchart for explaining a process for monitoring the devices according to the present invention.

An event table 10 stores events received from the agents 21 managing the devices (Refer to FIG. 11 and FIG. 12). Operations of the server 1 will be now described.

Figure 2:
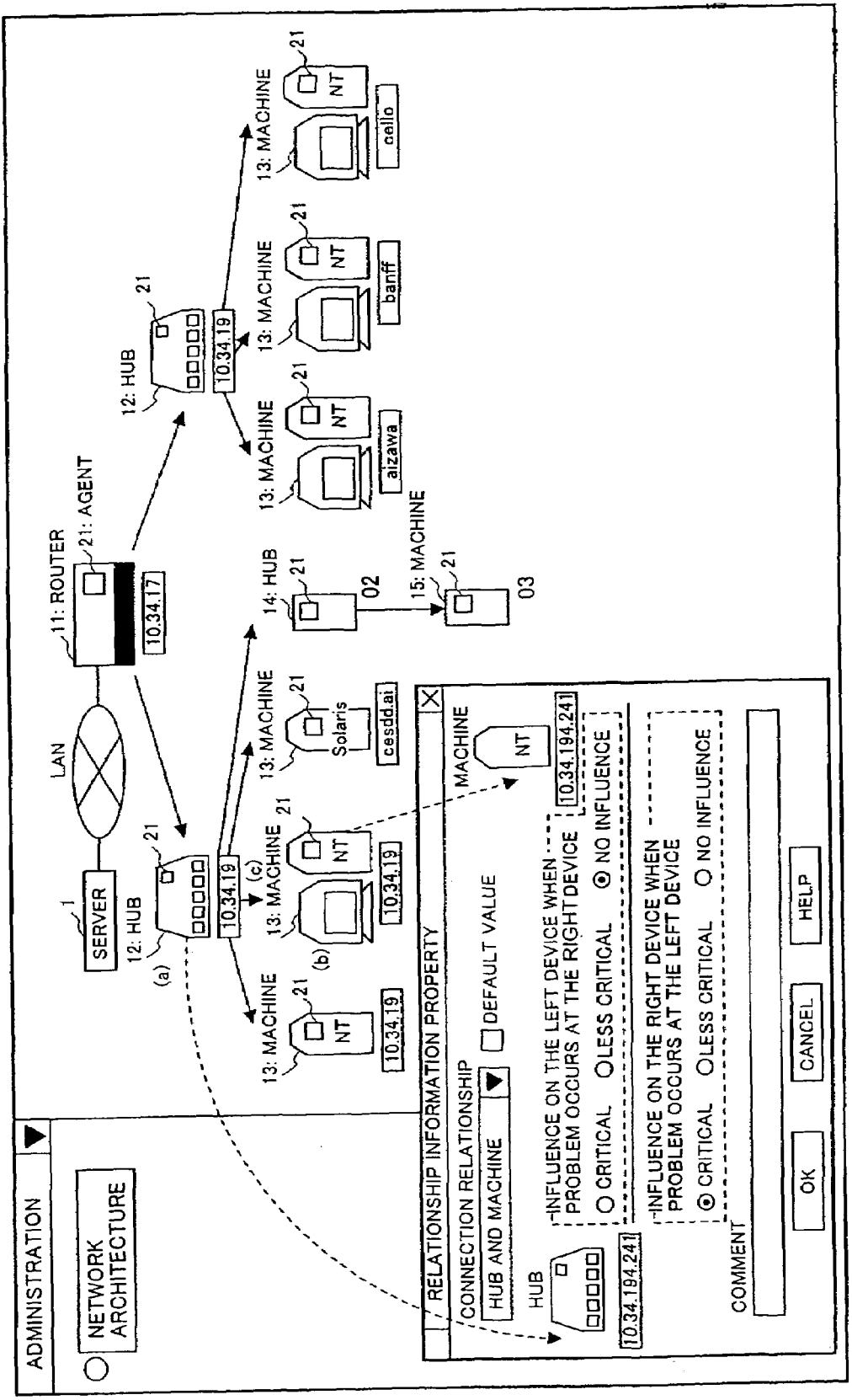
FIG. 2 is a diagram illustrating a display according to the present invention.

The event collecting part 5 receives and collects the events sent from the agents 21 shown in FIG. 2. The event correlating part 4 refers to a dependent relationship stored in the relationship object 9 and distinguishes a problem event indicating that a device is actually causing a problem. Thereafter, the event correlating part 4 outputs the problem event (for example, an icon representing the device is blinked at a display unit to indicate where the problem is occurring).

When the server 1 is notified that a device to be managed is changed or additionally provided, information in the management object 8 is changed or information of the additional device is provided as an additional management object 8. Also, the relationship information generating part 2 changes information in the relationship object 9 or generates an additional relationship object 9 based on the relationship information generating rule 6 corresponding to the device that is changed or additionally provided.

Furthermore, while information in the management object 8 is changed or information of the additional device is provided as the additional management object 8 when the server 1 is notified that a device to be managed is changed or additionally provided, the relationship information generating part 2 displays devices registered as the management objects 8. The relationship information generating part 2 changes information in or generates an additional relationship object 9 when a dependent relationship between the devices displayed is registered by selecting one of various types of the dependent relationship.

Accordingly, by providing the management object 8 managing the device and the relationship object 9 managing the dependent relationship between the devices, it is possible to add or change the device to be managed, and also specify and display the device actually causing a problem based on the events.

FIG. 2 is a diagram illustrating a display according to the present invention. In FIG. 2, a large display window as a main display window displays icons representing a router 11, hubs 12 and 14, and machines 13 and is based on configuration information for each device to be managed (for example, routers, hubs, machines and the like) in the management object 8. The main display window further displays arrows indicating dependent relationships based on the relationship object 9.

A small display window positioned at a lower left side is a sub-display window for indicating a dependent relationship between the devices to be managed. In this case, when the hub 12 indicated by a letter (a) and the machine 13 indicated by a letter (b) are clicked and selected by a user, the hub 12 and the machine 13 are displayed as a left icon and a right icon, respectively, in the sub-display window as indicated by dotted lines from the main display window. The user selects any one of the following settings for "INFLUENCE ON THE LEFT DEVICE WHEN A PROBLEM OCCURS AT THE RIGHT DEVICE" at an upper part of the sub-display window:

CRITICAL
LESS CRITICAL
NO INFLUENCE

In this case, it is assumed that "NO INFLUENCE" is selected. Similarly, the user selects any one of the following settings for "INFLUENCE ON THE RIGHT DEVICE WHEN A PROBLEM OCCURS AT THE LEFT DEVICE" at a lower part of the sub-display window:

CRITICAL
LESS CRITICAL
NO INFLUENCE

In this case, it is assumed that "CRITICAL" is selected. Information selected as shown in the sub-display window is registered as a hub-machine instance (the relationship object 8) as shown in FIG. 10C described later. By this selection, an arrow (c) indicated by a solid line from the hub 12 to the machine 13 is displayed in the main display window in FIG. 2.

As described above, the icons representing the devices connected to the network and being managed can be displayed on the main display window based on the configuration information of the management object 8. Moreover, the sub-display window can be displayed by selecting two icons for the devices being managed and displayed in order to define the dependent relationship between the two devices. By indicating the dependent relationship (defined as any one of "CRITICAL", "LESS CRITICAL" and "NO INFLUENCE") between two devices, the indicated dependent relationship is registered in the relationship object 9 and can be displayed on the main display window by a directed arrow.

It should be noted that each agent 21 in FIG. 2 is a program that is provided in each device to be managed and sends an event indicating a problem occurrence to the server 1.

FIG. 3 is a diagram for explaining objects according to the present invention. In FIG. 3, a status is shown in which the management objects 8 and the relationship objects 9 are registered for the devices shown on the left side of the main display window in FIG. 2. Dotted squares show the management objects 8 and the relationship objects 9 automatically generated when a hub 14 and a machine 15 in FIG. 2 are additionally provided.

As described above, the configuration information of each of the devices connected to the network to be managed (routers, hubs, machines and the like) is registered as a management object 8. Therefore, as shown in the left side of FIG. 2, it is possible to display each device to be managed in a hierarchical structure and each dependent relationship showing a dependent direction by an arrow. Further, when additional devices to be managed are provided, additional management objects 8 and relationship objects 9 are generated. Then the hub 14, the machine 15, the arrow showing the dependent relationship between the hub 12 and the hub 14, and the arrow showing the dependent relationship between the hub 14 and the machine 15 in FIG. 2 are additionally displayed. That is, it is possible to dynamically display added devices. Details thereof will now be described.

FIG. 4 is a flowchart for explaining operations according to the present invention. FIG. 4 shows steps for generating a relationship object by using the main display window and the sub-display window in FIG. 2.

In a step S1 of FIG. 4, a user clicks on an icon.

In a step S2, a process menu is displayed. That is, in response to the click on the icon, the process menu (including a relating process in this case) is displayed.

In a step S3, it is checked whether or not the relating process is selected from the process menu displayed in the step S2. When the relating process is selected (YES), a step S4 is executed. When the relating process is not selected (NO), another process that is selected by the user is executed in a step S8.

In the step S4, a destination device to be related is selected. That is, the user selects devices to be managed in order to create the relationship object 9 by clicking on, for example, the icon of the hub 12 indicated by the letter (a) and the icon of the machine 13 indicated by the letter (b).

In a step S5, the sub-display window is displayed for the relationship information. That is, the two devices selected in the step S5 to be managed (in this case, the icon of the hub 12 indicated by the letter (a) and the icon of the machine 13 indicated by the letter (b)) are displayed, and the following information is displayed for the user to indicate the dependent relationship.

for "INFLUENCE ON THE LEFT DEVICE WHEN PROBLEM OCCURS AT THE RIGHT DEVICE"
CRITICAL
LESS CRITICAL
NO INFLUENCE
for "INFLUENCE ON THE RIGHT DEVICE WHEN PROBLEM OCCURS AT THE LEFT DEVICE"
CRITICAL
LESS CRITICAL
NO INFLUENCE In a step S6, the dependent relationship is selected. With regard to the above two directions (left to right and right to left) displayed in the sub-display window on the lower left side, it is assumed that "CRITICAL" and "NO INFLUENCE" are selected for "INFLUENCE ON THE LEFT DEVICE WHEN PROBLEM OCCURS AT THE RIGHT DEVICE" and "INFLUENCE ON RIGHT DEVICE WHEN PROBLEM OCCURRED AT LEFT DEVICE", respectively.

In a step S7, an instance for a hub-machine class is generated. That is, an instance (a relationship object 9) for a hub-machine class described in FIG. 10C is generated.

As described above, after the relating process is selected from the process menu, devices to be managed (for example, the hub 12 indicated by the letter (a) and the machine 13 indicated by the letter (b)) are selected to define a relationship. Then, the sub-display window in FIG. 2 is displayed. Thus, the dependent relationships can be selected on the sub-display window (in this case, "CRITICAL" and "NO INFLUENCE" are selected for "INFLUENCE ON LEFT DEVICE WHEN PROBLEM OCCURRED AT RIGHT DEVICE" and "INFLUENCE ON THE RIGHT DEVICE WHEN PROBLEM OCCURS AT THE LEFT DEVICE"). Then, it is possible to generate a relationship object 9 such as shown in FIG. 10C described later.

FIG. 5 is a flowchart for explaining a rule process for providing an additional node. FIG. 5 shows steps for automatically generating a relationship object 9 in response to an addition of a device to be managed.

In a step S11 of FIG. 5, a rule for adding a node is executed.

In a step S12, a hub having the same MAC (Media Access Control) address as the additional node is searched for. For example, when a user wishes to add the machine 15 of FIG. 2, the rule process starts to search for a hub having the same MAC address as the machine 15 that is the additional node. It is assumed that a port of the hub 14 is directly connected to the machine 15. Thus, the port maintains the same MAC address as the machine 15.

In a step S13, it is checked whether or not the same MAC address is found. In this case, it is determined that the same MAC address is found (YES) since the hub 14 has the same MAC address as the machine 15. In a step S14, an instance of a hub-machine class (the relationship object 9 described later in FIG. 10C) is automatically generated in accordance with steps S21 through S24.

In a step S21, an object ID=02 for a hub is substituted for an object ID1. That is, the object ID=02 for the hub 14 as a parent in FIG. 2 is input in a column of the object ID1 (parent) of the relationship object 9 in FIG. 10C so that the object ID=02 is registered.

In a step S22, an object ID=03 for a machine is substituted for an object ID2. That is, the object ID=03 for the machine 15 as a child in FIG. 2 is input in a column of the object ID2 (child) of the relationship object 9 in FIG. 10C so that the object ID=03 is registered.

In a step S23, "CRITICAL" is substituted for a dependence 1->2. That is, in accordance with a rule for automatically creating an instance (relationship object 9), for example, a hub-machine instance in FIG. 8 described later, "CRITICAL" is substituted for the dependence 1->2. That is, "CRITICAL" is input in a column of the dependence 1->2 so that a dependent relationship from the hub 14 as a parent to the machine 15 as a child in FIG. 2 is "CRITICAL".

In a step S24, "NO INFLUENCE" is substituted for a dependence 2->1. That is, in accordance with the rule for automatically creating the instance (relationship object 9), for example, the hub-machine instance in FIG. 8 described later, "NO INFLUENCE" is substituted for the dependence 2->1. That is, "NO INFLUENCE" is input in a column of the dependence 2->1 so that a dependent relationship from the machine 15 as a child to the hub 14 as a parent in FIG. 2 is "NO INFLUENCE".

As described above, when devices to be managed (routers, hubs, machines or the like) are additionally provided, in accordance with a corresponding rule (for example, when a machine is additionally connected to a hub, the rule in FIG. 8 described later is used), it is possible to automatically create a relationship object 9 for registering a dependent relationship between the additional device and another device to be managed.

FIG. 6 is a flowchart for explaining a process for generating the relationship object according to the present invention.

In a step S31 of FIG. 6, a management object 8 for registering a device detected in another process is created. That is, for example, the process creates a management object 8 (such as a management object 8 in FIG. 10A or FIG. 10B) indicating that the configuration information of a device to be managed, which device is additionally provided and detected in the network, is registered.

In a step S32, additional information is received. That is, the process receives additional information (such as a MAC address and the like) necessary for creating a relationship object 9 from the agent 21 arranged for monitoring the devices.

In a step S33, a class is distinguished. That is, the process distinguishes a class for the detected device and another device creating the dependent relationship.

In a step S34, a rule is searched for. That is, the process searches for a rule applying to the class distinguished in the step S33. For example, a rule in FIG. 8 applying to the class for a hub and a machine is retrieved.

In a step S35, the rule is executed. That is, a relationship object 9 is automatically created by the rule applying to the class, which rule was found in the step S34. For example, the relationship object 9 shown in FIG. 10C is created in accordance with the rule in FIG. 8. Then, the steps S34 and S35 are repeated to complete all relationship objects 9.

As described above, when a management object 8 is detected, a rule for a device corresponding to the management object 8 and another a device directly connected thereto is applied and then dependent relationship between the two devices is generated as a relationship object 9.

FIG. 7 is a diagram showing a class structure according to the present invention. At least the following information as shown in FIG. 7 is registered.

Hub class:
   Object ID
   Port No[ ]
   MAC Address[ ]
Hub-MachineRel class:
   Object ID1
   Object ID2
   Dependency (dependent relationship)
Machine class:
   Object ID
   MAC Address[ ]

It should be noted that the information described above is shown in FIG. 7.

Therefore, the class structure is used. Instances of the hub class and the machine class (for example, see FIG. 10A and FIG. 10B) are defined as the management objects 8 (for example, see FIG. 10A and FIG. 10B) and the instance of the Hub-MachineRel class is defined as the relationship object 9 (for example, see FIG. 10C).

FIG. 8 is a diagram showing a rule for generating relationship according to the present invention. The rule is used to automatically generate a relationship object 9 between a hub and a machine. The first few lines:
   CLASS 1 OF MANAGEMENT OBJECT TO BE MANAGED:
      Hub CLASS
   CLASS 2 OF MANAGEMENT OBJECT TO BE MANAGED:
      Machine CLASS
define a generating rule for a relationship object 9 for the Hub class and the Machine class. In the same way, another relationship object 9 for other classes is defined.

A condition is defined as follows:
   CLASS OF RELATIONSHIP OBJECT TO BE GENERATED WHERE A MAC Address PROPERTY FOR CLASS 1 IS THE SAME AS A MAC Address PROPERTY FOR CLASS 2.

When the condition above is true, a Hub-MachineRel class is generated. Properties of the relationship object 9 are registered as follows:
   Dependency PROPERTY<-INSTANCE OF CLASS 2 DEPENDS ON INSTANCE OF CLASS 1

Dependency PROPERTY<-INSTANCE OF CLASS 1 DOES NOT INFLUENCE INSTANCE OF CLASS 2

In accordance with the rule shown in FIG. 8, the relationship object 9 where the hub and the machine are mutually connected is generated. For example, the relationship object 9 shown in FIG. 10C can be automatically created.

Figure 9:
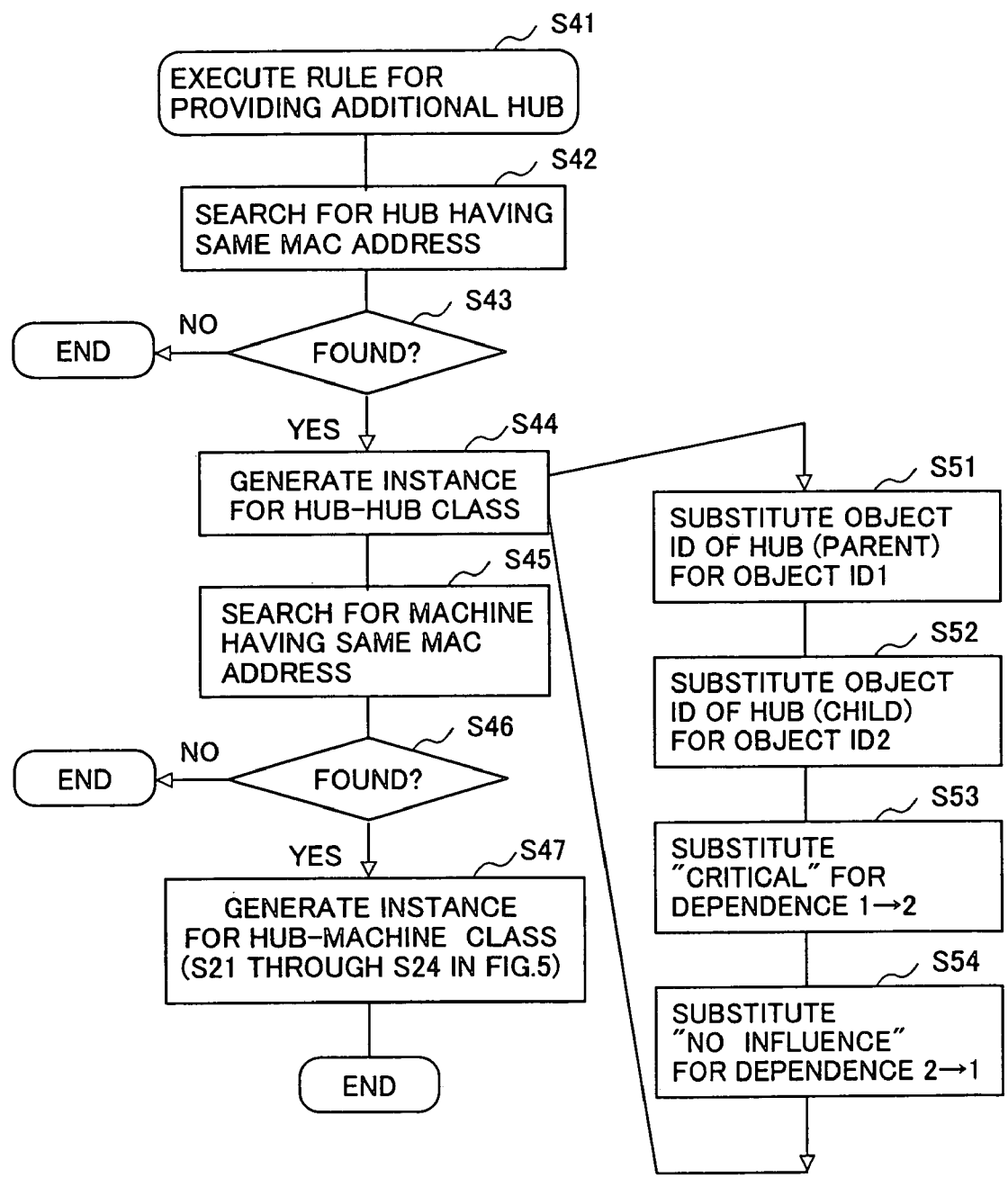
FIG. 9 is a flowchart for explaining a process for additionally provide a hub according to the present invention.

FIG. 9 is a flowchart for explaining a process for additionally providing a hub according to the present invention.

In a step S41 of FIG. 9, a rule for additionally provide a hub is executed.

In a step S42, a hub having the same MAC address is searched for. That is, for example, when the hub 14 in FIG. 2 is additionally provided, a hub having the same MAC address as the hub 14 is searched for. In the case of FIG. 2, the hub 12 indicated by the letter (a), which is above the hub 14, is found. The same MAC address as the hub 14 additionally provided is searched for from port information managed in the management object 8 of the hub 12 indicated by the arrow (a) where any one of ports is connected to the hub 14.

In a step S43, it is judged whether or not the hub having the same MAC address as the hub 14 is found. When it is judged that the hub having the same MAC address as the hub 14 is found (YES), the process advances to a step S44. On the other hand, when it is judged that the hub having the same MAC address as the hub 14 is not found (NO), the process is terminated since there is no hub having the same MAC address as the hub 14.

In the step S44, an instance for a hub—hub class is generated. A relationship object 9 for a dependent relationship between hubs is generated by executing steps S51 through S54.

In a step S51, an object ID of a parent hub is substituted for an object ID1 (parent). Similarly to the relationship object 9 in FIG. 10C, the object ID of the parent hub is input in a column of the object ID1 (parent) of the instance (relationship object 9) of the hub—hub class so as to be registered.

In a step S52, an object ID of a child hub is substituted for an object ID2 (child) Similarly to the relationship object 9 in FIG. 10C, the object ID of the child hub is input in an column of the object ID2 (child) of the instance (relationship object 9) of the hub—hub class so as to be registered.

In a step S53, "CRITICAL" is substituted for the dependence 1->2. That is, "CRITICAL" is substituted for the dependence 1->2 in accordance with a rule for generating the instance (relationship object 9) of the hub—hub class that is similar to a rule for automatically generating an instance (relationship object 9) of the hub-machine class in FIG. 8. In other words, the dependent relationship from the parent hub to the child hub is defined as "CRITICAL", similarly to the column of the dependence 1->2 of FIG. 10C.

In a step S54, "NO INFLUENCE" is substituted for the dependence 2->1. That is, similarly to the column "DEPENDENCE 2->1" in FIG. 10. Therefore, when a device (hub) to be managed is additionally provided to connect to another device (hub) to be managed, it is possible to automatically generate a relationship object 9 to register a dependence relationship between the device (hub) to be managed and another device (hub) to be managed, in accordance with a rule corresponding to a class of the two devices.

In a step S45, a machine having the same MAC address X is searched for.

In a step S46, it is judged whether or not the machine having the same MAC address X is found. When the machine is found (YES), the process advances to a step S47. On the other hand, when the machine is not found (NO), the process is terminated.

In the step S47, an instance (relationship object 9) of a hub-machine class is generated in a similar method to the steps S21 through S24 of FIG. 5 (see FIG. 10C).

As described above, when the hub 14 and the machine 15 in FIG. 2 are additionally provided, based on the management objects 8 where the configuration information of the additional hub 14 and machine 15 is registered, it is possible to automatically register the dependent relationship between hubs and the dependent relationship between the hub and the machine as the relationship objects 9, respectively.

FIG. 10A is a diagram showing an instance (management object 8) of a hub. In FIG. 10A, the instance (management object 8) of the hub shows a registration of the configuration information described therein.

hub ID: hub 0
object ID: 02
destination MAC address per port or its own MAC address As described above, a function of the hub automatically registers (learns) the MAC address of a destination device (hub, router, machine or the like) to be managed per port in the management object 8 for the hub. Thus, as described in flowcharts of FIG. 5 and FIG. 9, it is possible to automatically determine that two devices are mutually connected when the MAC address of the destination device to be managed corresponds to that maintained in the hub. Also, it is possible to automatically generate the relationship object 9 where the dependent relationship between the two devices is registered.

FIG. 10B is a diagram showing an instance (management object 8) of a machine. The configuration information is registered in the instance (management object 8) of the machine.

hub ID: machine 0
object ID: 03
MAC address: Mac1

As described above, the object ID and the MAC address are registered in the management object 8 of the machine. Based on the MAC address such as described in flowcharts of FIG. 5 and FIG. 9, it is possible to automatically determine that two devices are mutually connected when the MAC address of the device to be managed corresponds to that maintained in the destination hub. Also, it is possible to automatically generate the relationship object 9 where the dependent relationship between the two devices is registered.

FIG. 10C is a diagram showing an instance (relationship object 9) of a hub-machine class. In FIG. 10C, the instance (relationship object 9) between the devices described in FIG. 10A and FIG. 10B shows a registration of the configuration information described therein.

hub ID: hub-machine 0
object ID1 (parent): 02 (object ID for a device to be managed as a parent)
object ID2 (child): 03 (object ID for a device to be managed as a child)
dependence 1->2 (dependent relationship from the parent to the child): "CRITICAL"
dependence 2->1 (dependent relationship from the child to the parent): "NO INFLUENCE"

As described above, the dependent relationship from the parent to the child and the dependent relationship from the child to the parent are automatically registered in accordance with the rule. In FIG. 11 and FIG. 12 described later, when a problem event is sent from the agent 21 being managed to the server 1, influence of events can be suppressed by the dependent relationship. Thus, it is possible to make only an icon of FIG. 2 representing a device actually causing a problem to blink on the main display window in FIG. 2 so as to inform the administrator of that problem.

FIG. 11 is a flowchart for explaining a process for monitoring the devices according to the present invention.

In a step S61 of FIG. 11, an event from the agent 21 is received. That is, the event collecting part 5 included in the server 1 in FIG. 1 receives the event including information about a problem or the like of the device being managed, which event is sent from the agent 21.

In a step S62, it is checked by searching for a relationship object 9 whether or not a related management object exists. That is, information (such as an object ID), which is included in the problem event, of the device is registered. For example, it is checked whether or not the relationship object 9 such as described in FIG. 10C exists.

In a step S63, an event of the management object 8 related to the relationship object 9 is searched for.

In a step S64, it is checked whether or not the event is found. When it is determined that the event is found (YES), a suppress-flag for the event is set to "ON" in an event table 10 such as shown in FIG. 12, in step S65. On the other hand, when it is determined that the event is not found (NO), the process is terminated.

As described above, in a case in which the process finds the relationship object 9 as shown in FIG. 10C including information of the device (object ID), which is included in the event received in the step S61, it is determined based on the dependent relationship determined in the relationship object 9 whether or not the event for the registered management object 8 is defined in the event table 10 in FIG. 12. When the event is defined, the suppress-flag is set to "ON" so that an alarm for the icon of the device corresponding to the event is suppressed. When the dependent relationship in the relationship object 9 is "CRITICAL" and another event for another device in a connection direction has been previously received and registered in the event table 10 in FIG. 12, the suppress-flag is set to "ON" so as not to display the alarm. Therefore, it is possible to make an alarm based on an event extracted from all events received, which event indicates where the problem is actually caused.

FIG. 12 is a diagram showing an event table according to the present invention. Every event sent from the agents 21 connected to the network is registered in the event table 10. In accordance with the flowchart in FIG. 11, when an event is registered, based on the registered relationship object 9 of the management object 8 defined in the received event, the suppress-flag of the event of the management object 8 for an influenced device is set to "ON" so as not to make an alarm. On the other hand, an icon representing a device for which the suppress-flag is set to "OFF" is blinked on the main display window in FIG. 2. Accordingly, only an icon representing a device actually causing a problem is blinked so that the administrator can easily realize and specify the device causing the problem.

Figure 13:
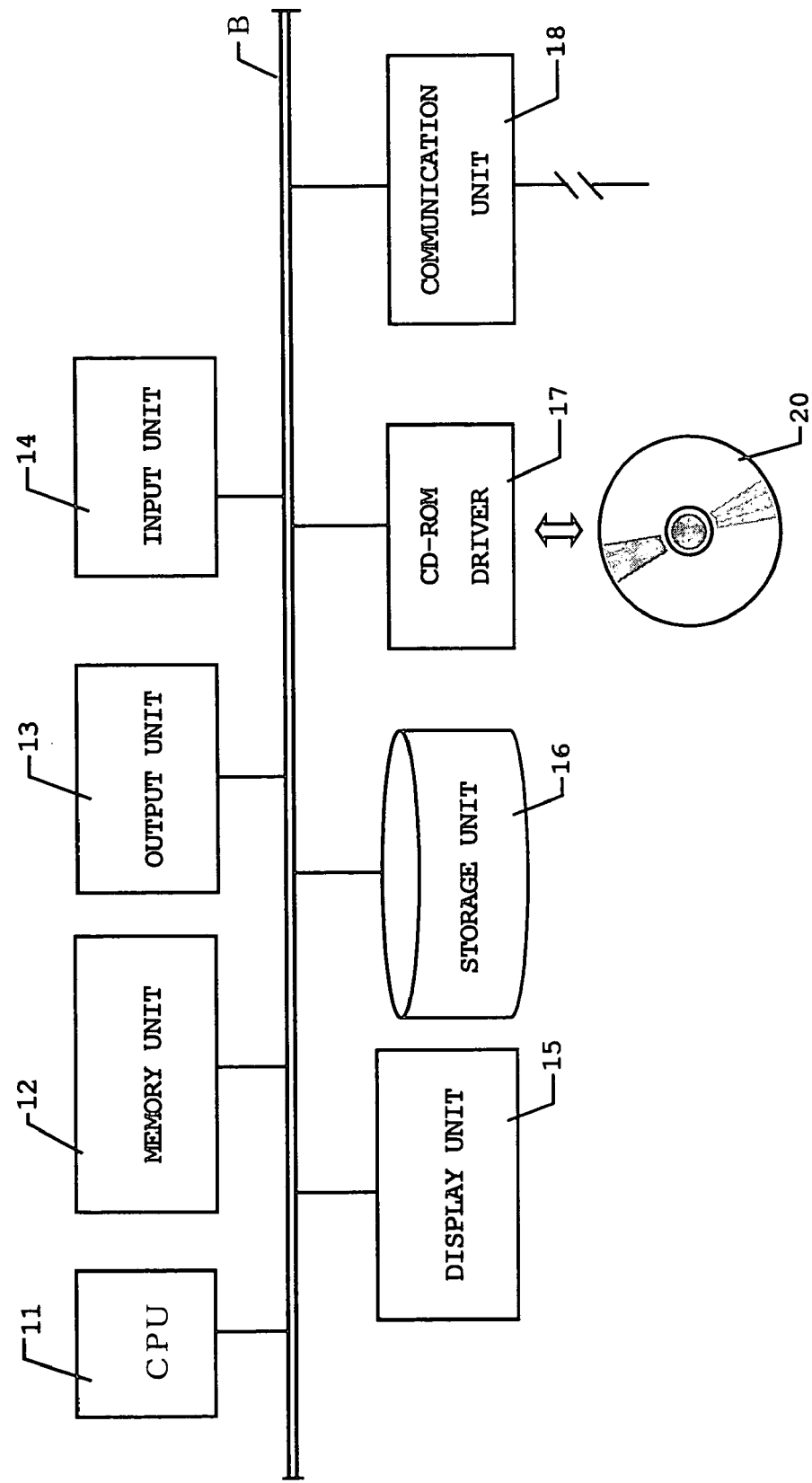
FIG. 13 is a block diagram of a hardware configuration that implements an apparatus for managing a network according to the present invention.

FIG. 13 is a block diagram of a hardware configuration that implements the server as the apparatus for managing a network according to the present invention.

The server 1 includes a CPU 11, a memory unit 12, an output unit 13, an input unit 14, a display unit 15, a storage unit 16, a CD-ROM driver 17 and a communication unit 18 which are mutually connected by a bus B. The CPU 11 controls the entire system in accordance with a program resident in the memory unit 12. In addition, the CPU 11 executes the process for defining a relationship between two devices, the rule process for providing an additional node and for monitoring the devices that are described above. The memory unit 12 includes a ROM and a RAM. Also, the memory unit 12 temporarily stores programs, events sent from the agents 21, various data and the like during the execution of the processes. The output unit 13 includes a printer or the like. The input unit 14 includes a keyboard and a mouse for the administrator to input information into the system, for example, in order to setup the network system, but is not limited to only these input devices.

The display unit 15 displays the main display window, the sub-display window, results of various processes, or the like.

The storage unit 16 includes a hard disk unit and stores various data and programs. Also, the storage unit 16 is used for the object DB 7 and the event table 10 in FIG. 1. In accordance with instructions from the CPU 11, the CD-ROM driver 17 reads information from a CD-ROM 20 set in the CD-ROM driver 17 and then provides the information to the storage unit 16. For example, various programs according to the present invention are provided by the CD-ROM 20. That is, the programs read from the CD-ROM 20 are installed in the storage unit 16 through the CD-ROM driver 17. It should be noted that a recording medium is not limited to a CD-ROM, but other computer-readable recording media such as a magnetic disk, a magnetic tape, an optical disk, a magneto optical disk, a semiconductor memory or the like may be used.

The communication unit 18 is used to receive or send information concerning events from or to the agents 21.

As described above, according to the present invention, the management object 8 for managing the information related to the devices connected to the network and the relationship object 9 for managing the dependent relationships between the devices are provided. The processes for additions and changes of the devices are dynamically executed. Moreover, the device that actually causes a problem can be specified and the alarm is displayed so as to inform the administrator that the problem is occurring at the device. Therefore, even in the distributed network system where a device configuration is dynamically changed or a device is additionally provided, it is possible to specify a device (a router, a hub, or a machine), which actually causes a problem, based on the events sent from the devices being managed and to inform the administrator of the problem on the display.

The present invention is not limited to the specifically disclosed embodiments, variations and modifications, and other variations and modifications may be made without departing from the scope of the present invention.

The present application is based on Japanese Priority Application No. 11-306365 filed on Oct. 28, 1999, the entire contents of which are hereby incorporated by reference.

What is claimed is:

1. An apparatus for monitoring devices connected to a network, comprising:
   a relationship object maintaining part maintaining dependent information for each relationship between devices connected to the network, said dependent information being predetermined to indicate a predefined type of influence one device has on another device when the one device causes a problem, said predefined type of influence being selected prior to occurrence of the problem;
   an event table maintaining part maintaining device information, which identifies a device in the network, indicated by an event received from the device;

an event collecting part collecting each event received from the devices and controlling the event table maintaining part to maintain the device information when the event indicates a problem; and a problem alarm notifying part determining, based on the dependent information maintained by the relationship object maintaining part, whether or not each of the devices identified by the device information maintained by the event table maintaining part influences another device by the problem, and specifying which device is causing the problem in accordance with a result of the determination, so that an alarm is displayed with respect to the specified device which is causing the problem and influencing another device.

2. The apparatus as claimed in claim 1, wherein said dependent information is predefined for each of a first direction from said one device to said another device and a second direction from said another device to said one device by said dependent information between the devices.

3. The apparatus as claimed in claim 1, wherein:

said device information maintained by said event table maintaining part includes a suppressing flag for suppressing said problem alarm notifying part from specifying that the device corresponding to said device information is causing the problem; and said problem alarm notifying part determines whether or not the event table maintaining part is to maintain the device information of another event received from another device indicated by the dependent information corresponding to said event received from the device, and controls a suppressing flag based on the dependent information in accordance with a result of the determination, so that said problem alarm notifying part specifies which device is causing the problem by checking that the suppressing flag is off.

4. The apparatus as claimed in claim 1, wherein when the event received from the device indicates to change or add the dependent information, said event collecting part controls said relationship object maintaining part to change or add the dependent information in accordance with a predetermined rule for defining the dependent information based on the relationship between two types of the devices.

5. The apparatus as claimed in claim 1, further comprising a management object maintaining part maintaining configuration information related to a configuration of each of the devices to be managed, wherein when the event received from the device indicates to change or add the configuration information, said event collecting part controls said management object maintaining part to change or add the configuration information indicated by the event, and controls said relationship object maintaining part to change or add the dependent information related to devices connected to the device that sent the event.

6. The apparatus as claimed in claim 1, further comprising:

a management object maintaining part maintaining configuration information related to a configuration of each of the devices to be managed;

a management object displaying part representing each configuration information maintained by said management object maintaining part as a clickable image on a display unit; and a relationship displaying part displaying several selectable types of the dependent information to define the dependent information between the devices corresponding to the clickable images when at least two clickable images are clicked, wherein the dependent information defined by said relationship displaying part is maintained by said relationship object maintaining part.

7. The apparatus as claimed in claim 1, further including means for selecting said predefined type of influence prior to occurrence of the problem.

8. A method for managing a network, comprising the steps of:

(a) selecting a predefined type of influence one device has on another device when the one device causes a problem prior to occurrence of the problem;

(b) maintaining dependent information indicating the predefined type of influence for each relationship between devices connected to the network;

(c) maintaining device information, which identifies a device in the network, indicated by an event received from the device;

(d) collecting each event received from the devices and executing the step (c) to maintain the device information when the event indicates a problem; and (e) determining, based on the dependent information maintained in the step (b), whether or not each of the devices identified by the device information maintained in the step (c) influences another device by the problem, and specifying which device is causing the problem in accordance with a result of the determination, so that an alarm is displayed with respect to the specified device which is causing the problem and influencing another device.

9. The method as claimed in claim 8, wherein said dependent information is predefined for each of a first direction from said one device to said another device and a second direction from said another device to said one device by dependent information between the devices.

10. The method as claimed in claim 8, wherein:

said device information maintained in said step (c)—includes a suppressing flag for suppressing from specifying that the device corresponding to said device information is causing the problem; and said step (e)—determines whether or not the device information of another event, which is received from another device indicated by the dependent information corresponding to said event received from the device, is to be maintained in the step (c), and controls said suppressing flag based on the dependent information in accordance with a result of the determination, so that said step (e) specifies which device is causing the problem by checking that the suppressing flag is off.

11. The method as claimed in claim 8, wherein when the event received from the device indicates to change or add the dependent information, said step (d) executes said step (b) to change or add the dependent information in accordance with a predetermined rule for defining the dependent information based on the relationship between two types of the devices.

12. The method as claimed in claim 8, further comprising a step of (f) maintaining configuration information related to a configuration of each of the devices to be managed, wherein when the event received from the device indicates to change or add the configuration information, said step (d) executes said step (f) to change or add the configuration information indicated by the event, and executes said step (b) to change or add the dependent information related to devices connected to the device that sent the event.

13. The method as claimed in claim 8, further comprising steps of:
   (f) maintaining configuration information related to a configuration of each of the devices to be managed;
   (g) representing each configuration information maintained in said step (f) as a clickable image on a display unit; and
   (h) displaying several selectable types of the dependent information to define the dependent information between the devices corresponding to the clickable images when at least two clickable images are clicked,
   wherein the dependent information defined in said step (h) is maintained in said step (b).

14. A computer-readable recording medium having a program recorded thereon for causing a computer to manage a network, comprising the codes of:
   (a) selecting a predefined type of influence one device has on another device when the one device causes a problem, prior to occurrence of the problem;
   (b) maintaining dependent information indicating the predefined type of influence for each relationship between devices connected to the network;
   (c) maintaining device information, which identifies a device in the network, indicated by an event received from the device;
   (d) collecting each event received from the devices and executing the code (c) to maintain the device information when the event indicates a problem; and
   (e) determining, based on the dependent information maintained by the code (b), whether or not each of the devices identified by the device information maintained by the code (c) influences another device by the problem, and specifying which device is causing the problem in accordance with a result of the determination, so that an alarm is displayed with respect to the specified device which is causing the problem and influencing another device.

15. The computer-readable recording medium as claimed in claim 14, wherein said dependent information is predefined for each of a first direction from said one device to said another device and a second direction from said another device to said one device by dependent information between the devices.

16. The computer-readable recording medium as claimed in claim 14, wherein:
   said device information maintained by said code (c) includes a suppressing flag for suppressing from specifying that the device corresponding to said device information is causing the problem; and
   said code (e) determines whether or not the device information of another event, which is received from another device indicated by the dependent information corresponding to said event received from the device, is to be maintained by the code (c), and controls said suppressing flag based on the dependent information in accordance with a result of the determination, so that said code (e) specifies which device is causing the problem by checking that the suppressing flag is off.

17. The computer-readable recording medium as claimed in claim 14, wherein when the event received from the device indicates to change or add the dependent information, said code (d) executes said code (b) to change or add the dependent information in accordance with a predetermined rule for defining the dependent information based on the relationship between two types of the devices.

18. The computer-readable recording medium as claimed in claim 14, further comprising the code of (f) maintaining configuration information related to a configuration of each of the devices to be managed,
   wherein when the event received from the device indicates to change or add the configuration information, said code (d) executes said code (f) to change or add the configuration information indicated by the event, and executes said code (b) to change or add the dependent information related to devices connected to the device that sent the event.

19. The computer-readable recording medium as claimed in claim 14, further comprising the codes of:
   (f) maintaining configuration information related to a configuration of each of the devices to be managed;
   (g) representing each configuration information maintained by said code (f) as a clickable image on a display unit; and
   (h) displaying several selectable types of the dependent information to define the dependent information between the devices corresponding to the clickable images when at least two clickable images are clicked,
   wherein the dependent information defined by said code (h) is maintained by said code (b).

* * * * *

UNITED STATES PATENT AND TRADEMARK OFFICE
CERTIFICATE OF CORRECTION

PATENT NO. : 6,990,601 B1 Page 1 of 1
DATED : January 24, 2006
INVENTOR(S) : Tsuneya et al.

It is certified that error appears in the above-identified patent and that said Letters Patent is hereby corrected as shown below:

Column 14,
Lines 40 and 43, delete "–".

Signed and Sealed this

Eleventh Day of April, 2006

JON W. DUDAS
*Director of the United States Patent and Trademark Office*